United States Patent [19]
Capps et al.

[11] Patent Number: 6,011,550
[45] Date of Patent: Jan. 4, 2000

[54] METHOD AND SYSTEM FOR EXPANDING AND CONTRACTING POINT OF SALE SCROLLING LISTS

[75] Inventors: Christopher Louis Capps, Raleigh; Scott Michael Hallihan, Cary; Brenda Maltba Scott; Gayle Colby Steinbugler, both of Raleigh, all of N.C.

[73] Assignee: International Business Machines Corporation, Armonk, N.Y.

[21] Appl. No.: 08/862,035

[22] Filed: May 22, 1997

[51] Int. Cl.[7] .................................................. G06F 3/60
[52] U.S. Cl. ........................ 345/342; 345/352; 345/962; 705/25
[58] Field of Search .................... 345/173, 179, 345/145, 339, 340, 347, 352, 353, 354, 356, 342; 705/15, 25, 26

[56] References Cited

U.S. PATENT DOCUMENTS

| | | | |
|---|---|---|---|
| 5,065,347 | 11/1991 | Pajak et al. | 345/348 |
| 5,235,509 | 8/1993 | Mueller et al. | 345/352 |
| 5,353,219 | 10/1994 | Mueller et al. | 705/15 |
| 5,539,870 | 7/1996 | Conrad et al. | 345/352 |
| 5,550,559 | 8/1996 | Isensee et al. | 345/123 |
| 5,708,787 | 1/1998 | Nakano et al. | 345/352 |
| 5,781,193 | 7/1998 | Alimpich et al. | 345/352 |
| 5,786,819 | 7/1998 | Weiser et al. | 345/354 |

*Primary Examiner*—Raymond J. Bayerl
*Assistant Examiner*—Cao H. Nguyen
*Attorney, Agent, or Firm*—Gerald R. Woods

[57] ABSTRACT

Provided is a method and system for displaying a list of items in point of sale transactions on a touch screen user interface by virtually adjusting the display area of a touch screen user interface. The method and system achieve the forgoing by the following steps. Detecting a selection and manipulation of the icon utilized as a virtual handle for expanding and contracting the window for displaying said list of items in point of sale transactions. Determining whether the window for displaying said list of items in point of sale transactions is in either an expanded or contracted state. If it is determined that said window for displaying said list of items in point of sale transactions is in a contracted state, enlarging the window for displaying the list of items in point of sale transactions in response to the detected manipulation of the icon utilized as a virtual handle. If it is determined that said window for displaying said list of items in point of sale transactions is in an expanded state, contracting said window in response to a detected selection of the icon utilized as a virtual handle.

26 Claims, 14 Drawing Sheets

METHOD AND SYSTEM FOR EXPANDING AND CONTRACTING POINT OF SALE SCROLLING LISTS

BACKGROUND OF THE INVENTION

1. Technical Field

The present invention relates, in general, to an improved touch screen user interface method and system. In particular, the present invention relates to an improved touch screen user interface method and system which makes it easier for a user to enter and display point of sale transaction data, view, and act upon previously entered point of sale transaction data. Still more particularly, the present invention relates to an improved touch screen user interface method and system which makes it easier for a user to enter and display point of sale transaction data, view, and act upon previously entered point of sale transaction data by creating a visual mechanism that resembles a window shade which allows the user to expand or contract a list of items.

2. Description of the Related Art

A touch screen user interface is a type of interface that utilizes a touch screen. A touch screen is a computer screen designed or modified to recognize the location of a touch on its surface. By touching the screen, the user can make a selection or move a cursor. The simplest type of touch screen is made up of a grid of sensing lines, which determine the location of a touch by matching vertical and horizontal contacts. Another, more accurate, type uses an electrically charged surface and sensors around the outer edges of the screen to detect the amount of electrical disruption and pin point exactly where contact has been made. A third type embeds infrared light emitting diodes and sensors around the outer edges of the screen. These diodes and sensors create an invisible infrared grid which the user's finger interrupts, in front of the screen. Infrared touch screens, because they are completely sealed, are often used in dirty environments where contaminants could interfere with the operation of other types of touch screens. *Microsoft Press Computer Dictionary* 295 (2 ed. 1994).

A touch screen is thus a computer screen modified such that the location where a user has touched the screen can be determined with particularity. A touch screen user interface is a type of man-machine interface that enables a user to enter data, and cause the execution of program commands, merely by pointing to or touching a pictorial representation on a computer screen. Thus, a touch screen user interface is a type man-machine interface that allows users to directly interface with the computer merely by touching a computer screen.

Touch screen interfaces have proved to be vastly popular and useful in many areas of commerce. One of the areas of commerce in which such touch screen user interfaces have proved to be both popular and useful is the retailing of fungible items.

Such popularity of touch screen user interfaces in the retailing of fungible items tends to arise because such touch screen user interfaces allow workers with widely varying skills to accomplish the same functions. One industry, in particular, where items sold are fungible and where touch screen user interfaces have proven particularly useful has been the fast food industry.

In the fast food industry each fast food store generally has a certain limited set of food items which its sells. Over the course of time, fast food retailers have found it helpful to be able to maintain data via computer databases regarding the sales of various types of fast food items. For example, such fast food retailers may wish to know the average times at which certain items are purchased, the average time between purchases, and the average number of such items sold per hour or per day. By keeping a running total of such information over the course of time, fast food retailers can derive such desired information.

Computer databases are uniquely suited to tracking this type of information. However, the widely varying skills of workers often makes entry of information into a computer database via standard keyboard input unfeasible. Furthermore, the fast pace at which transactions occur within the fast food industry would tend to indicate that the accuracy of such entries into a computer database, even if such skills did exist within the fast food industry work force, would tend to be inaccurate. Thus, problems have existed within the fast food industry regarding how to track the desired information given the skills of the workforce and the rapid nature of the sales transactions.

In a nutshell, the foregoing problems can be summarized by stating that the workers in the fast food industry sometimes do not have the skills necessary to adequately input sales data into a traditional computer database system in a timely and accurate manner. Touch screen user interfaces have solved the majority of the foregoing cited problems. Touch screen user interfaces have solved the problems by decreasing the amount of information and concepts that each individual worker has to be able to grasp in order to correctly and effectively carry out the recordation of the sale of fungible retail items such as fast food items.

A touch screen user interface may be configured such that a user of the interface need only have a very limited vocabulary in order to effectively carry out the sales of the fungible items retailed by the establishment for which that individual works. The touch screen user interface may be configured such that a user of such an interface need only be able to understand a limited set of words such as entrees, sides, breads, desserts, beverages, and specials. Furthermore, it is common to pair with such words pictographic representations of such words so that a user can utilize the touch screen user interface, and effectively record the sale of items, even if such user has difficulty with reading. Thus, rather than having to struggle with a traditional computer system interface, with a touch screen interface a worker need merely point and touch a picture of an object to be sold. In other words, a touch screen user interface transmutes the rather cognitive task of a retail sale and its entry into a computer system into a purely manual task of pointing at an object.

While touch screen user interfaces thus have proven very useful and effective in making it possible for widely disparate users to be able to effectively record certain point of sale transactions, there are difficulties in using such interfaces. One such difficulty arises from the fact that the foregoing noted pairings of words with pictographic representations consumes a large amount of space on the touch screen itself. As the number of items to be displayed increases, the amount of touch screen space consumed becomes a problem from the standpoint of resolution and accuracy, because the areas of the touch screen which a user is to touch are not large enough such that a user can actuate those areas accurately. This problem is referred to in the art as the "real estate problem," which is a metaphor for the fact that the region of the touch screen available for display (i.e., the "real estate") is smaller than that necessary for effective interaction with the display.

That is, the "real estate problem" refers to the fact that the touch screen area has become so small that manually activating items is difficult. Previous solutions to the foregoing noted "real estate problem" have tried to solve the problem by introducing hierarchically arranged screens such that if a user needed more detail regarding a particular item, than the user could activate a portion of the touch screen user interface which would bring forward and totally replace a current screen with another data screen showing more detail.

While the foregoing noted solution (hierarchically arranged screens, with each level showing more and different detail) to the problem has proven adequate in some applications, it has generally not proven to be adequate for the recordation of point of sale transactions in many retail fields, such as the fast food industry. One reason that it is not proven adequate in such industries is that the point of sale transactions to be recorded are often rapid and the workers often do not have the ability to do the conceptual juggling required to go from one screen to another and back without becoming confused. Thus, a problem exists in the application of touch screen user interfaces: how to maintain the ease of use of such touch screen user interfaces and yet still allow more information to be entered into, and more user interaction with, such touch screen interfaces, without requiring that a user flip back and forth between different hierarchically arranged computer screens. In other words, how to solve the "real estate problem" without using hierarchically arranged screens.

It is apparent from the foregoing that a need exists for a method and system which will allow the capabilities of a touch screen user interface to be expanded such that a user can more easily input, track, and edit point of sale transaction data without requiring that the user switch back and forth between different hierarchically arranged screens. That is, a need exists for a touch screen user interface method and system which will expand the power of a particular touch screen user interface and yet still maintain the conceptual ease of use and intuitive applications for which touch screen user interfaces were originally developed.

SUMMARY OF THE INVENTION

It is therefore one object of the present invention to provide an improved touch screen user interface method and system.

It is another object of the present invention to provide an improved touch screen user interface method and system which makes it easier for a user to enter and display point of sale transaction data, view, and act upon previously entered point of sale transaction data.

It is yet another object of the present invention to provide an improved touch screen user interface method and system which makes it easier for a user to enter and display point of sale transaction data, view and act upon previously entered point of sale transaction data, by creating a visual mechanism that resembles a window shade which allows the user to expand or contract a list of items.

The foregoing objects are achieved as is now described. Provided is a method and system for displaying a list of items in point of sale transactions on a touch screen user interface by virtually adjusting the display area of a touch screen user interface. The method and system achieve the foregoing by the following steps. Detecting a selection and manipulation of the icon utilized as a virtual handle for expanding and contracting the window for displaying said list of items in point of sale transactions. Determining whether the window for displaying said list of items in point of sale transactions is in either an expanded or contracted state. If it is determined that said window for displaying said list of items in point of sale transactions is in a contracted state, enlarging the window for displaying the list of items in point of sale transactions in response to the detected manipulation of the icon utilized as a virtual handle. If it is determined that said window for displaying said list of items in point of sale transactions is in an expanded state, contracting said window in response to a detected selection of the icon utilized as a virtual handle.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
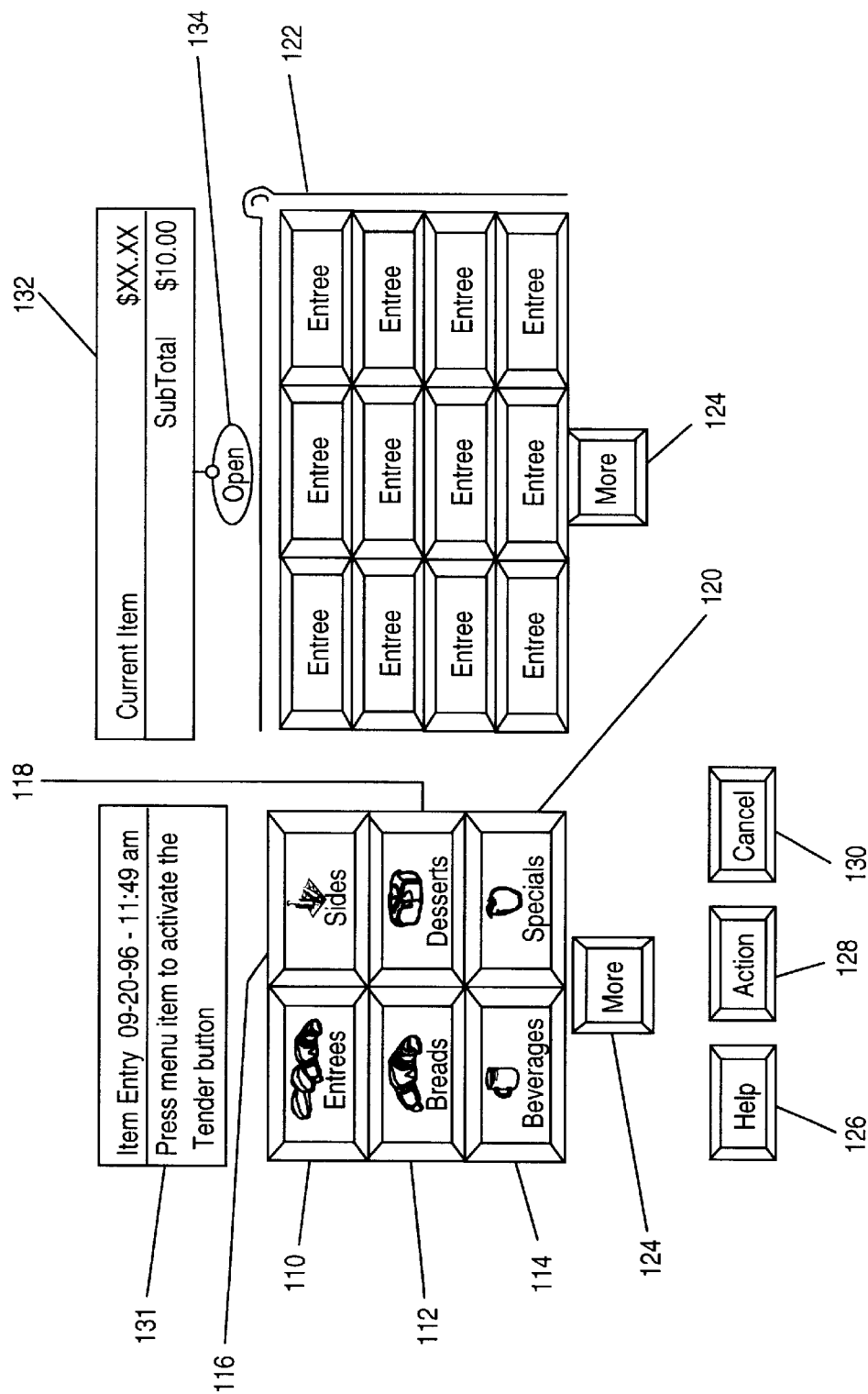
FIG. 1 illustrates a touch screen utilized within an illustrative embodiment of the present invention.

With reference now to the figures and in particular with reference now to FIG. 1, there is shown a touch screen utilized within an illustrative embodiment of the present invention. Although each item shown within FIG. 1 is actually an item that appears on a touch screen, it is common to refer to individual items as "buttons". Shown in FIG. 1 are categorical buttons composed of an entrees button 110, a breads button 112, a beverages button 114, a sides button 116, a desserts button 118, a specials button 120, and a collection of buttons 122. Also shown are "more" buttons 124, a help button 126, a cancel button 130, and a user information box 131. Lastly, a window shade box 132 in conjunction with an "open" pull ring 134 is shown.

Figure 2:
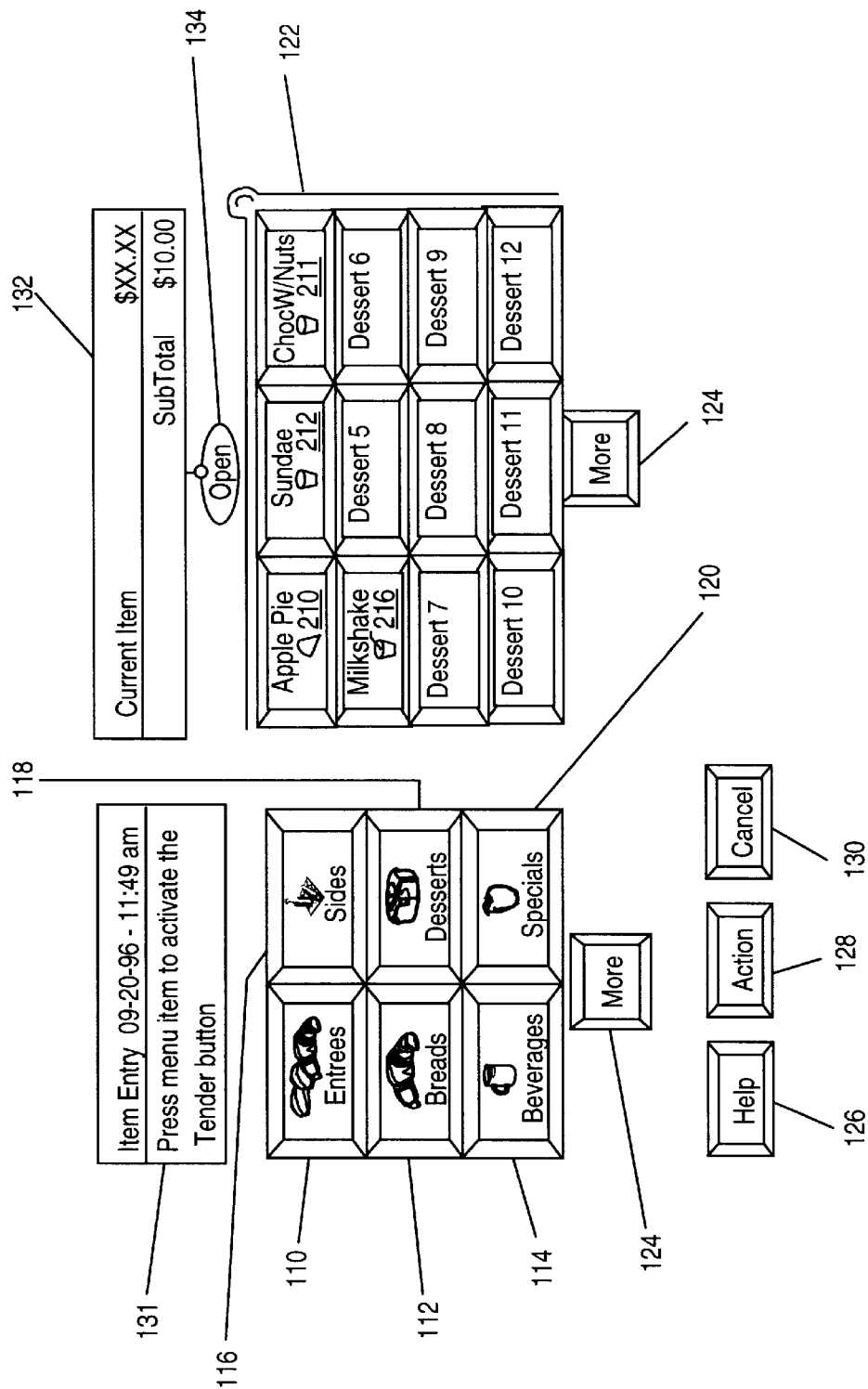
FIG. 2 is an illustration of how the touch screen might look subsequent to a categorical button being touched.

In an illustrative embodiment of the present invention, when a user wishes to denote the sale of a particular item, the user will touch one of the categorical buttons. Such touching of a categorical button will activate the computer which will respond by supplying appropriate names and icons for items within that category to the collection of buttons 122 such that the names and pictographic representations of the items within that category are displayed on the collection of buttons 122. For example, referring now to FIG. 2 which is an illustration of how the touch screen might look subsequent to desserts button 118 being touched, one can see that certain of the collection of buttons 122 have been replaced by buttons indicative of dessert items sold by the restaurant within that category. For example, FIG. 2 shows an apple pie button 210, a sundae button 212, a chocolate sundae with nuts button 214, and a milk shake button 216 for sake of illustration, (the rest of collection of buttons 122 are merely labeled generally as desserts 5–12).

As has been stated, when a user wishes to record the fact that a certain item has been sold, the user touches the button associated with the item. For example, if a user wanted to record a sale of a chocolate sundae with nuts, the user would touch chocolate sundae with nuts button 214. In response to the touching of the chocolate sundae with nuts button 214, the computing system would place into an ordered list that item.

Figure 3:
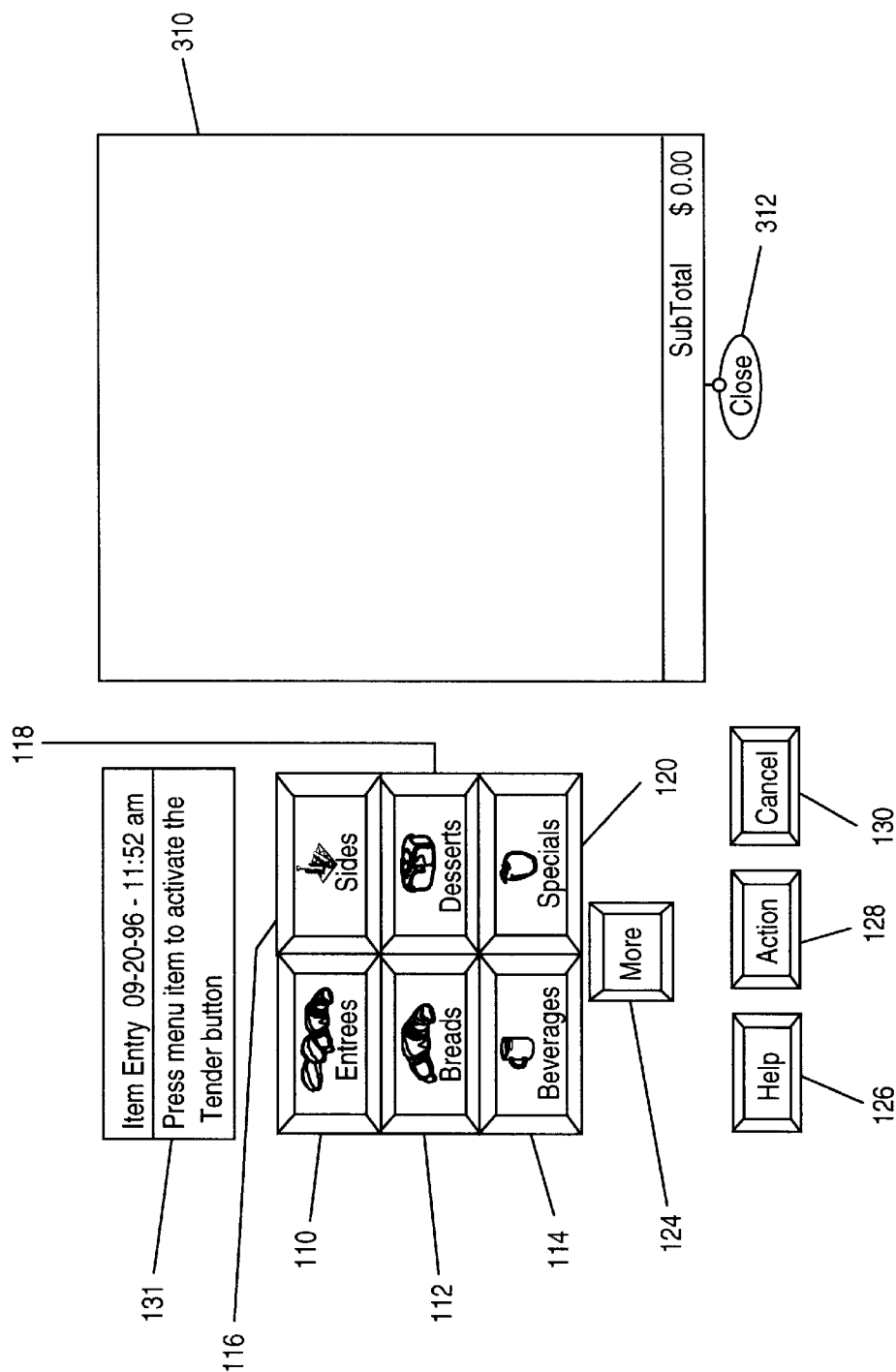
FIG. 3 is an isolated view of an expanded window shade box in conjunction with "close" pull ring symbol.

Refer now to FIG. 3, which is a isolated view of an expanded window shade box 310 in conjunction with "close" pull ring symbol 312 similar to window shade box 132 in conjunction with "open" pull ring symbol 134 as shown in FIG. 1. Notice that the window shade box 310 in conjunction with "close" pull ring symbol 312 in FIG. 3 appear similar to an old fashioned roll-type window shade which is opened by "tugging" a pull ring downward and closed by "tugging" and releasing a pull ring upward.

Figure 4A:
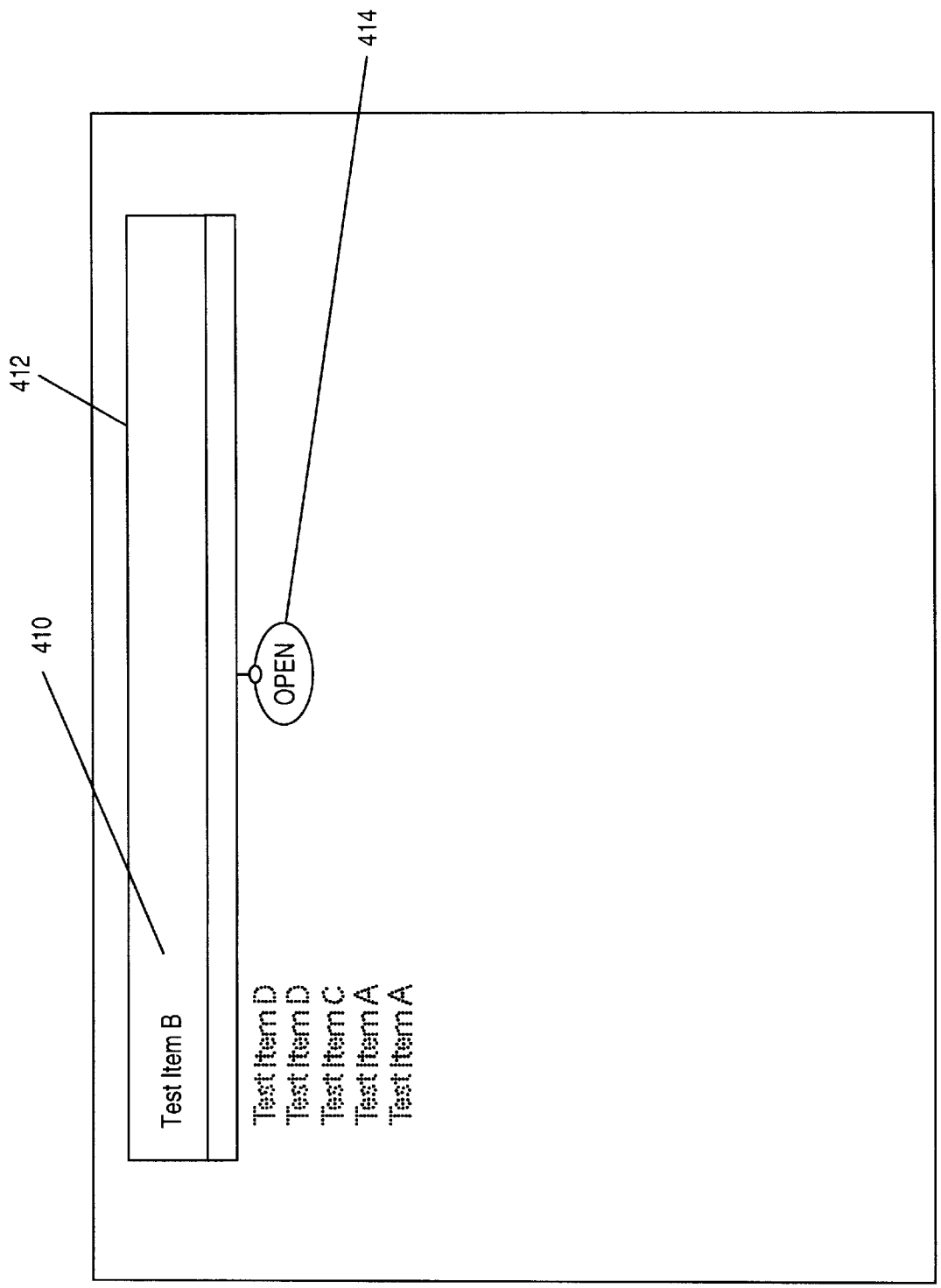
FIG. 4A shows the situation wherein an ordered list of items appears in sequence but with only the most recently entered item displayed.
Figure 4B:
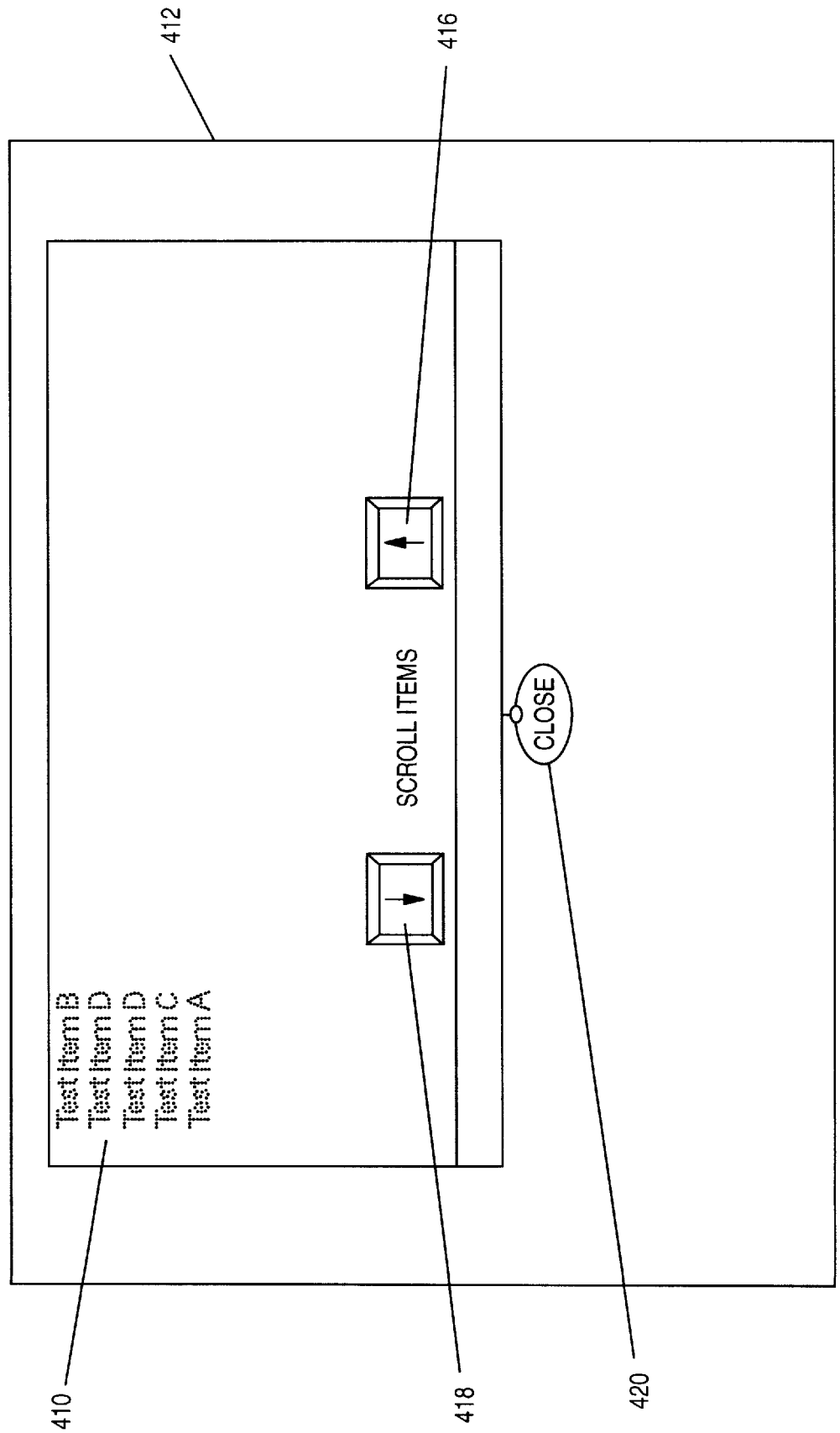
FIG. 4B shows that a window shade box can be expanded via the window shade technique.
Figure 4C:
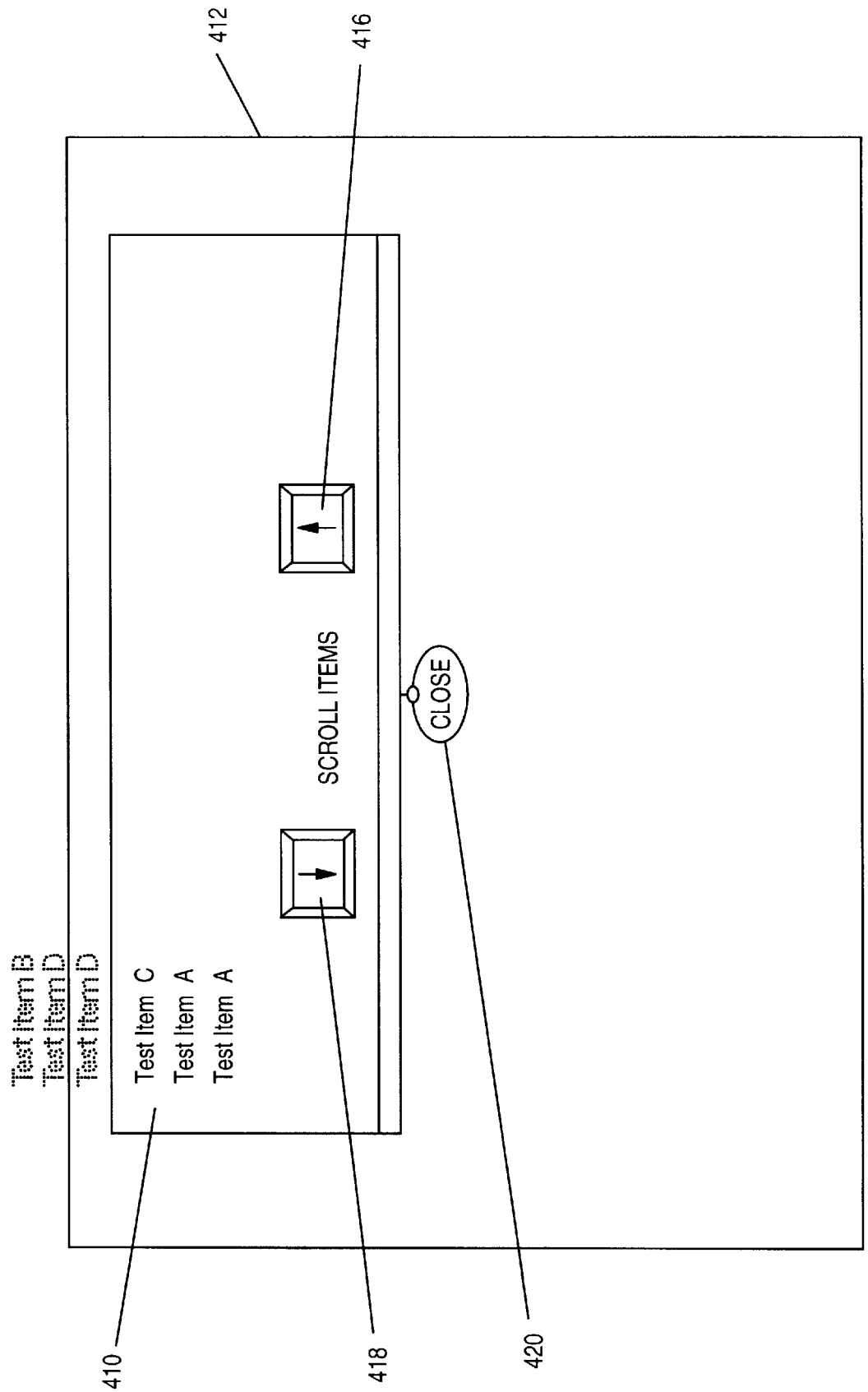
FIG. 4C depicts a window shade box expanded but of a size insufficient to display the totality of items entered.

FIGS. 4A, 4B and 4C are partially schematic representations that illustrate the functioning and method of an illustrative embodiment of the present invention.

Refer now to FIG. 4A, wherein an ordered list of items appears in sequence but with only the most recently entered item displayed in current item line 410 of contracted window shade box 412 (because the window is contracted, only that item occupying the current item line 410 is visible, but the other previously entered items are still present but not displayed, a fact denoted by the items shown in dotted lines in FIG. 4A). Depicted in FIG. 4A is test item B on current item line 410. In FIG. 4A, associated with the current item line there is now an "open" pull ring symbol 414. This ring can be utilized to expand window shade box 412 such that a user can view all items previously entered for a particular order in sequence. Once the current item window has been so expanded, actions can be performed on the items within the list, such as voiding items, or changing item quantities.

Referring now to FIG. 4B, it can be seen that window shade box 412 can be expanded via the window shade technique. Window shade box 412 shown in FIG. 4B was expanded by a user first placing his or her finger onto "open" pull ring symbol 414 (FIG. 4A) and "pulling" downward (i.e., moving his or her finger downward on the touch screen). As is apparent from FIG. 4B, upon expansion of window shade box the last five previously entered items (which were illustrated in FIG. 4A as dotted lines indicating that the items were hidden) are displayed. Within FIG. 4B there are depicted upward scrolling arrow 416 and downward scrolling arrow 418 which are utilized to move through the previously entered items. For example, if downward scrolling arrow 418 is utilized, then the user can scroll downwards through the list from the current item in the window (exactly how and when such buttons can be utilized will be explained below). Furthermore, upward scrolling arrow 416 can be used to go back up the list. A user can then use other keys (not shown) to modify or take action upon the list of items as appropriate.

Should a user not wish to see as many items as are currently displayed within a list the user can place his or her finger into "close" pull ring 420, which in one illustrative embodiment would completely "close" the window shade box. Subsequently, in one illustrative embodiment, a user could re-open the window to the desired size using an "open" pull ring.

With reference now to FIG. 4C, which depicts window shade box 412 as expanded, of a size not sufficient to display the totality of the items entered. With respect to FIG. 4C, what is depicted is the display of item list subsequent to a user moving one page of items down past the first page of items. Assuming that none of the previous items shown in FIG. 4B (test items B, D, D, C, A) have been voided, it is known that the actual items in the list extend off window shade box 412 in a vertical direction. These items are shown in FIG. 4C by dotted lines and correspond to the list previously displayed in FIG. 4B with test item B followed by test item D being off the display and hence shown by dotted lines, followed by test item D being off the display and hence shown by dotted lines, followed by test item C being off the display and hence shown by dotted lines, test item A, and test item A, which are all shown as solid lines since they are actually on the display. In the situation shown, a user could subsequently activate upward scrolling arrow 416 to return to the previous page of items.

Notice that the illustrative embodiment of the present invention described in relation to FIGS. 4A–4C shows that the useable surface (i.e., "real estate") of the touch screen user interface can be expanded by an expanded window shade box such that the user can see the list of recorded and sold items without the user having to go to another hierarchically arranged screen or having the list permanently occupy space on the screen that can be used for buttons, thus making the use of hierarchical screens unnecessary. Also, notice that when the user no longer desires to use the list within the expanded window shade box, the list can be collapsed by touching the pull ring which closes the window shade. Notice also that the scrolling techniques allow user customization and will allow lists that are even larger than the window shade box when it is extended in its full length, so that the list of items can be bigger than that of the window shade box itself.

Figure 5:
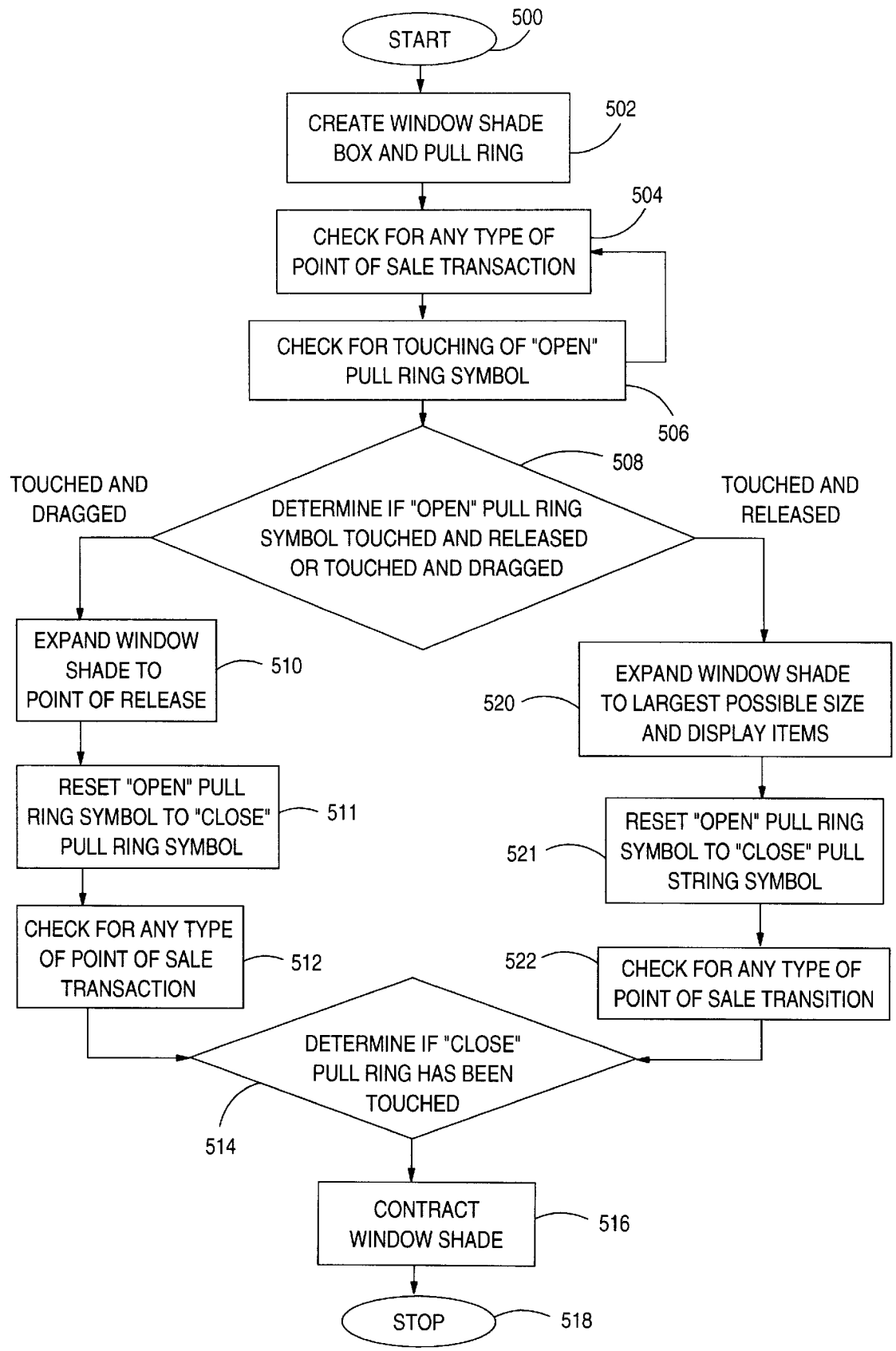
FIG. 5 is a high level logic flowchart depicting the method and process of an illustrative embodiment of the present invention.

Refer now to FIG. 5 which is a high-level logic flowchart depicting the method and process of an illustrative embodiment of the present invention. Method step 500 depicts the start of the process. Method step 502 illustrates the creation of a window shade box and pull ring symbol as has been illustrated previously in FIGS. 1–4C (exactly how the window shade box and pull ring symbol are created will be discussed in detail below in reference to FIG. 6). Method step 504 shows the checking for any type of point of sale transaction that occurs subsequent to the creation of the window shade box and pull ring as discussed in reference to method step 502. Method step 504 is meant to illustrate that virtually any type of point of sale transaction, which could be recorded in the contracted window shade box can occur at this point and that the present process will take notice of such occurrence. An example of the types of point of sale transactions that may be monitored and detected at method step 504 would be the addition of an item, the voiding of a current item, or the performing of other actions on an item.

Subsequent to method step 504 the process proceeds to method step 506 which depicts the checking for any touching of an "open" pull ring symbol as displayed on the touch screen user interface. Should no touching of an "open" pull ring symbol be detected the process proceeds to method step 504 where it again checks for any type of point of sale transaction that could be occurring. Subsequent to this the process proceeds to method step 506. The method step 504-method step 506-method step 504 loop continues until a touching of the "open" pull ring symbol is detected, in which case the process proceeds to method step 508. The foregoing described loop is intended to indicate that it is possible for a user to engage in numerous point of sale transactions without ever expanding the window shade box. That is, the method step 504-506-504 loop will allow a system to function normally without ever expanding the window shade box via touching an "open" pull ring symbol. On the other hand, if it is detected that an "open" pull ring symbol has been touched the process proceeds to method step 508.

Method step 508 depicts the determination of the extent to which an "open" pull ring symbol has been touched. That is, method step 508 depicts the determination of whether an "open" pull ring symbol was touched and released or touched and dragged. In the event that an "open" pull ring symbol was merely touched and released the process proceeds to method step 520 wherein it is illustrated that the window shade box is expanded to the largest possible size available within the touch screen user interface and as many items as will fit within the window shade box are displayed. The reason that the window shade is so expanded is that a touch and release of an "open" pull ring symbol is interpreted to mean that the window shade box to be expanded to its largest possible size and show as many items in the window shade box as is possible. Consequently, subsequent to the window shade box being expanded to its largest possible size in method step 520, the process proceeds to method step 521. Method step 521 depicts the resetting of the pull ring symbol to be a "close" pull ring symbol rather than a previous "open" pull ring symbol. Method step 522 essentially is the equivalent of method step 504 in that at this point checking for any type of point of sale transaction takes place. Subsequent to the checking for any type of point of sale transaction as was described in relation to method step 522, the process proceeds to method step 514 wherein it is determined if a "close" pull ring symbol has been touched. If the determination of method step 514 yields the result that a "close" pull ring symbol has been touched the process proceeds to method step 516 wherein the window shade box is contracted to its smallest possible size (that is to its current item size, as was discussed in reference to FIGS. 1–4C). Subsequent to this, the process proceeds to method step 518 and stops.

If the determination of method step 508 yielded the result that an "open" pull ring symbol was touched and dragged, then the process proceeds to method step 510. Method step 510 depicts the expansion of the window shade box in accordance with the distance that an "open" pull ring symbol was dragged and released. Once the window has been so expanded, the process proceeds to method step 511. Method step 511 depicts the resetting of the pull ring symbol to be an "close" pull ring symbol rather than the previous "open" pull ring symbol.

Method step 512 depicts a method step that is essentially equivalent to method step 504, as discussed above, in that at this point the process begins to scan for any type of point of sale transaction input. Subsequent to method step 512, the process proceeds to method step 514 wherein it is determined whether a "close" pull ring symbol has been touched. In the event that a "close" pull ring symbol has been touched, the process proceeds to method step 516 wherein the window shade box is contracted to its smallest possible area. Subsequently, the process proceeds to method step 518 and stops. However, if the inquiry of method step 514 did not determine that the "close" pull ring symbol has been touched the process proceeds in loop wise fashion back to method step 512 wherein checking for any type of point of sale transaction is again done.

Figure 6:
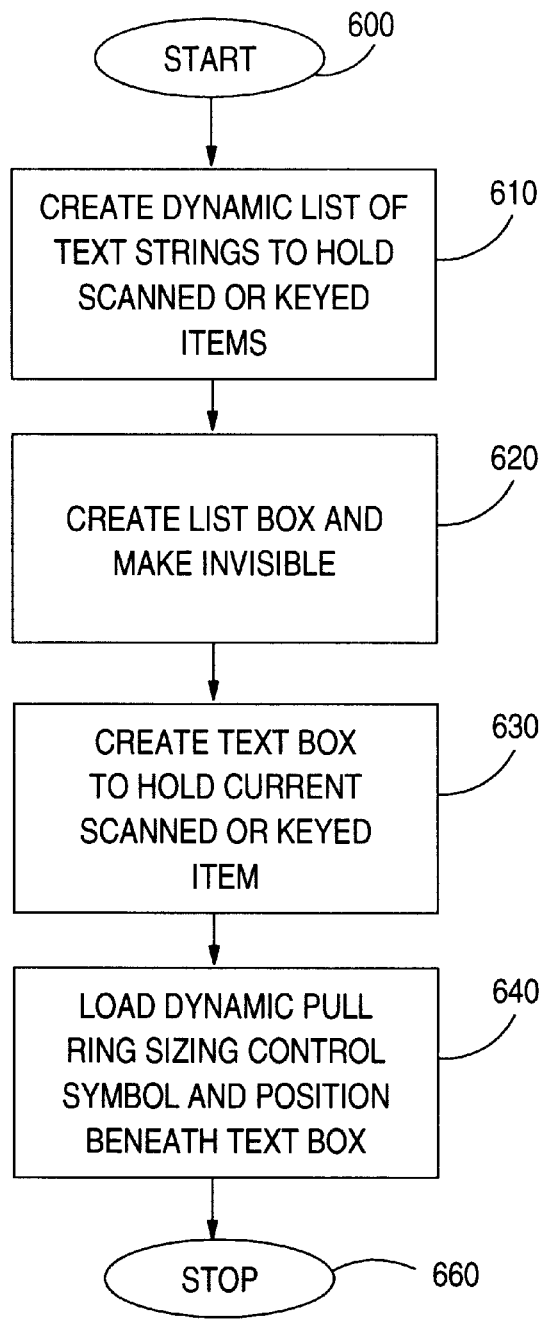
FIG. 6 is a high-level logic flowchart of the method and process whereby the creation of the window shade box and pull ring symbol as referenced in method step 502 are created.

Refer now to FIG. 6 which is a high-level logic flowchart of the method and process whereby the creation of the window shade box and pull ring symbol as referenced in method step 502 are created. Method step 600 depicts the start of the process. Method step 610 illustrates the creation of a dynamic list of text strings to hold scanned or keyed items. That is, method step 610 illustrates that a list of text strings, wherein each text string is equivalent to an item to be displayed within a window shade box, is created. This list will subsequently be used to display the items in the window shade box on the touch screen interface.

Method steps 610, 620, and 630 show the actual creation of two window shade boxes: a text box, which will be utilized to display the fully contracted window shade box populated with an item taken from a dynamic list of text strings; and, a list box, which will be utilized to display an expanded window shade box populated with items taken from a dynamic list of text strings. That is, two created boxes will be utilized to give the on-screen illusion of one window shade box that expands and contracts. Method step 620 illustrates the creation of a list box, which is then made invisible meaning that the box will not be currently displayed on a touch screen user interface. Method step 630 depicts the creation of a text box to hold the current scanned or keyed item. Method step 630 is intended to illustrate the creation of graphical objects sufficient to create the appearance of contracted window shade box 132 as is shown in FIG. 1. The list box created in method step 620 in conjunction with the dynamic list of text strings created in method step 610 will be utilized to create an expanded window shade box when appropriate. The text box created in method step 630 will be utilized to display the current item in the window shade box when the expanded list box is not active by merely displaying the text box on the screen and making the list box invisible.

Method step 640 loads the dynamic pull ring symbol and locates the pull ring symbol beneath the text box. Thus, method step 630 in conjunction with method step 640 are intended to show the creation of objects necessary to create both contracted window shade box 132 and "open" pull ring symbol 134 depicted in FIG. 1, while method steps 610, and 620 in conjunction with method step 640 are intended to show the creation of objects necessary to create both the expanded window shade box 310 and "close" pull ring symbol 312 depicted in FIG. 3. Subsequent to the foregoing, the process proceeds to method step 660 and stops.

Figure 7:
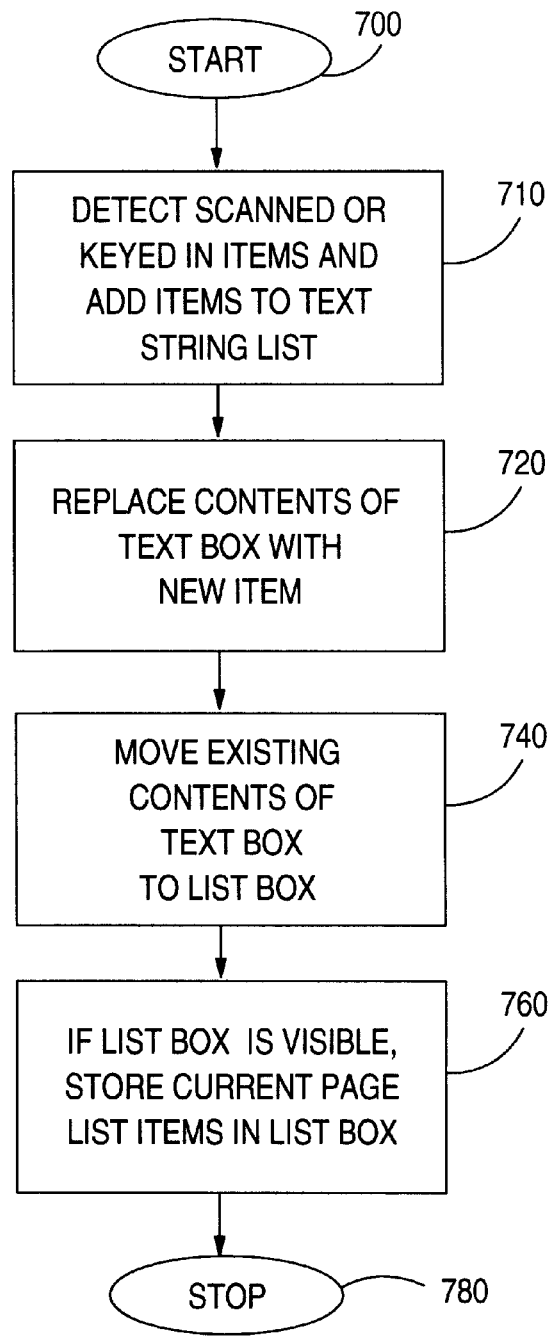
FIG. 7 is a high-level logic flowchart depicting the method and process of method step 504 as referenced in FIG. 5.

Refer now to FIG. 7 which is a high-level logic flowchart depicting the method and process of method step 504 as referenced in FIG. 5. Method step 700 depicts the start of the process. Method step 710 illustrates the detection of items being either scanned or entered into a computer system in such a fashion as to indicate that some type of point of sale transaction has taken place, and the subsequent addition to a dynamic text string list (such as that referenced in method step 610 of FIG. 6) of the detected scanned or keyed items. Method step 720 shows the replacement of the contents in the text box (which, recall from the discussion of FIG. 6, is utilized to display the current item in the fully contracted window shade box) with the new item just detected in method step 710, which would make the just detected scanned or keyed in item appear in the location of the string "current item" in the window shade box 132 as depicted in FIG. 1.

Method step 740 shows that the existing contents of the text box (which contains the current item) is moved out of the text box and moved into the list box. Subsequently, method step 760 depicts that if the list box is currently visible, then the preexisting contents of the text box is placed at the head of the list and the other list items adjusted accordingly. Subsequent to method step 760 the process proceeds to method step 780 and stops.

Figure 8:
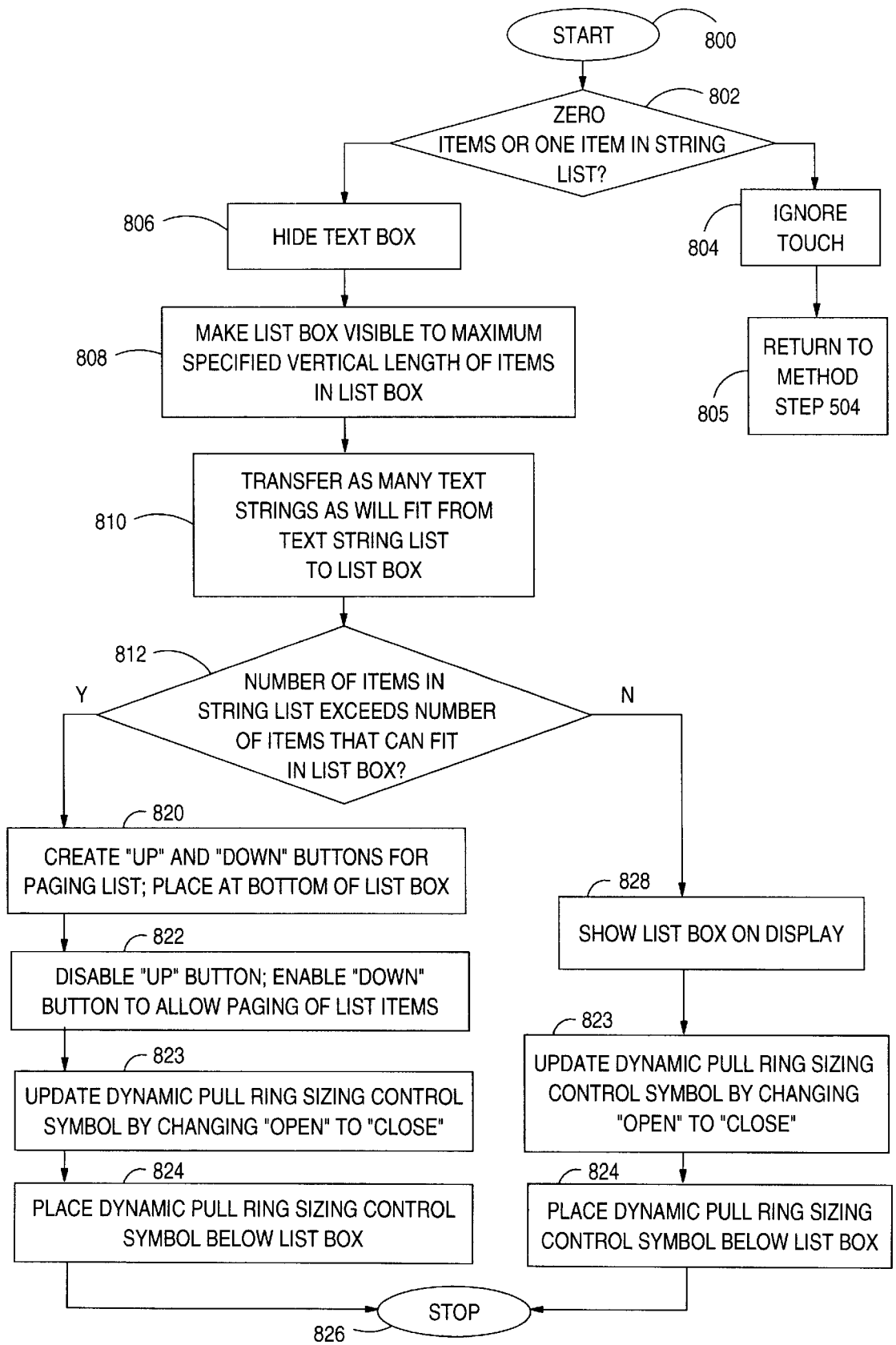
FIG. 8 is a high-level logic flowchart depicting the method and process of the expansion of the window shade to its largest possible size and display of items therein and the subsequent resetting of the "open" pull ring symbol to the "close" pull ring symbol as was referenced in method steps 520 and 521 of FIG. 5.

Refer now to FIG. 8 which is a high-level logic flowchart depicting the method and process of the expansion of the window shade to its largest possible size and the display of items therein, and the subsequent resetting of the "open" pull ring symbol to the "close" pull ring symbol as was discussed in relation to method steps 520 and 521 of FIG. 5. Method step 800 depicts the start of the process. Method step 802 illustrates the determination of whether zero or one items are in a list box, such as the one created as discussed in relation of method step 610 of FIG. 6. Should the determination of method step 802 yield the result that zero or one items are found to be in string list, the process proceeds to method step 804 wherein the touch is ignored. Subsequently, the process proceeds to method step 805 wherein it is depicted that the process returns to method step 504 of FIG. 5 and continues from that point.

However, if the inquiry of method step 802 indicated that more than one item is currently in string list, then the process proceeds to method step 806. Method step 806 depicts the removal, or hiding, of the text box (which is utilized to show the contracted window shade box when only the current item is displayed) from the display of the touch screen user interface. Method step 808 depicts the first in a series of steps which are necessary to replace the text box that was just removed from the display of the touch screen user interface with an expanded window shade box showing a list of items. Method step 808 depicts the consultation of a parameter known as "maximum specified number of items to be vertically displayed within any list box", this parameter is one that is envisioned to be specified by application designer. Thus, the illustrative embodiment of the present invention being discussed can be adjusted such that only a certain maximum specified number (e.g., three, five, seven, etc.) of items will be vertically displayed within any list box. Method step 810 shows that subsequent to the list box being created in accord with the "maximum specified number of items to be vertically displayed within any list box" (which is a parameter specified by a system administrator), the number of text strings equivalent to "maximum specified number of items to be vertically displayed within any list box" are transferred from the text string list to the list box. The transfer occurs with the most recent entered item being transferred to the list box first, with that most recent entered item being placed at the head of the list box, and with all other entered items being listed in reverse sequence of entry (i.e., with the most recent items appearing near the head of the list and the first entered items appearing near the foot of the list.)

Once the list box has been created in accord with "maximum specified number of items to be vertically displayed within any list box," it must be determined as in method step 812 whether the list box as created in accordance with the parameter can display all strings from the string list. If it is determined that the list box as created cannot contain all strings from the string list, it is necessary to create a mechanism whereby such items can be accessed. Accordingly, method step 820 shows the creation of up and down buttons for paging through the list, and that those up and down buttons are subsequently placed at the bottom of the list box as has been shown in both FIGS. 4B and 4C.

Method step 823 depicts the updating of the dynamic pull ring sizing control "open" symbol to be a "close" pull ring symbol. That is, in one illustrative embodiment, once a window is opened it can only be closed, so it is necessary to change the pull ring symbol such that the symbol reflects what operation is available at that point. Subsequently, method step 824 shows the creation of the dynamic pull ring sizing control symbol and the placement of that symbol below the created and displayed list box. Subsequently, the process proceeds to method step 826 and stops.

Should the inquiry of method step 812 yield the determination that the number of items from the string list to be placed in the list box does not exceed the size of the list box, then the process proceeds to method step 828 wherein it is shown that the list box is displayed as created in method steps 808–810. Method step 823 depicts the updating of the dynamic pull ring sizing control "open" symbol to be a "close" pull ring symbol. That is, in one illustrative embodiment, once a window is opened it can only be closed, so it is necessary to change the pull ring symbol such that the symbol reflects what operation is available at that point. Subsequently, method step 824 shows the creation of the dynamic pull ring sizing control symbol and the placement of that symbol below the created and displayed list box. Subsequently, the process proceeds to method step 826 and stops.

Figure 9:
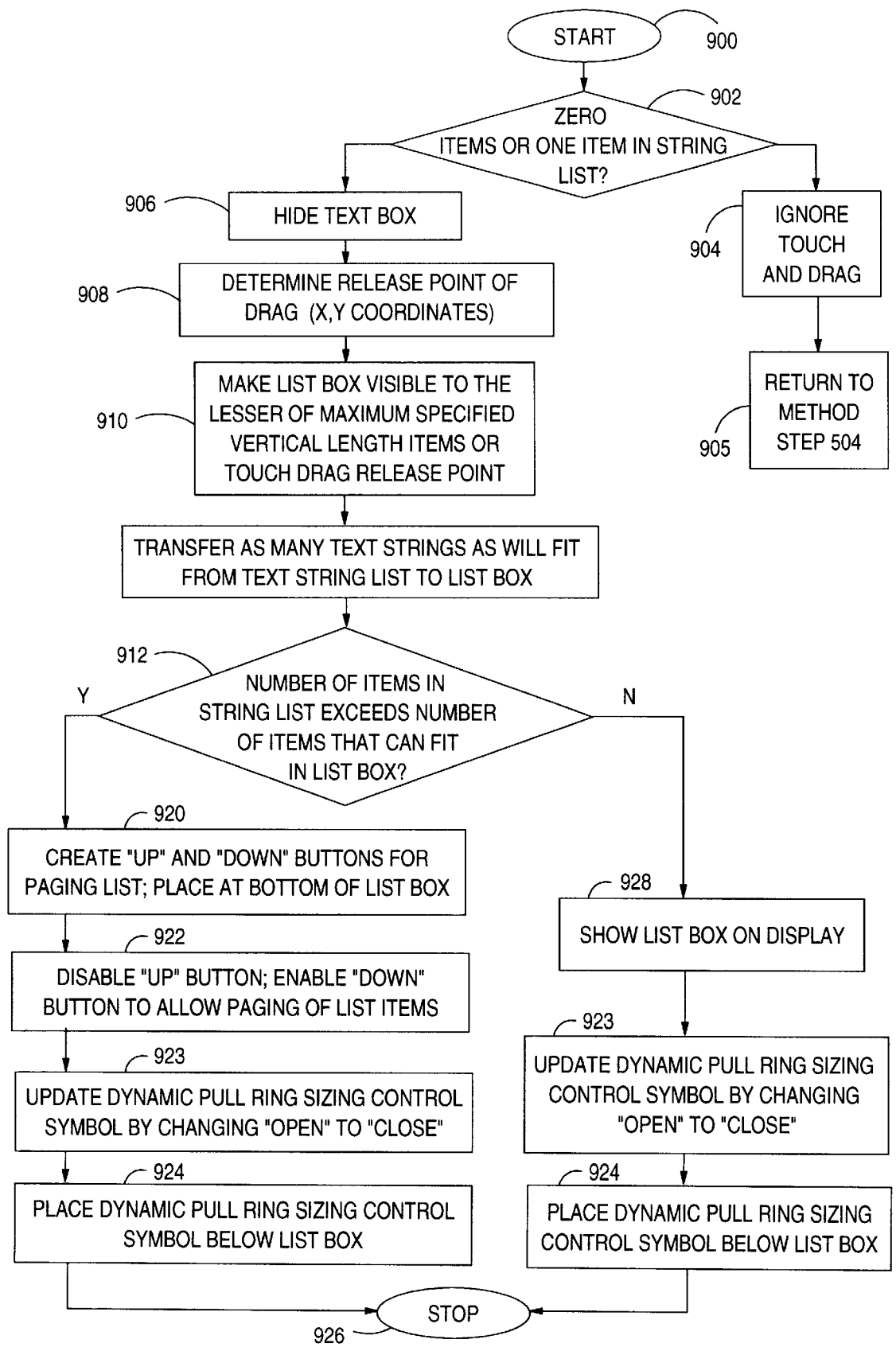
FIG. 9 is a high-level logic flowchart depicting the method and process of the expansion of the window shade and display of items therein and the subsequent resetting of the "open" pull ring symbol to the "close" pull ring symbol as was referenced in method steps 510 and 511 of FIG. 5.

Refer now to FIG. 9 which is a high-level logic flowchart depicting the method and process of the expansion of the window shade and the display of items therein and the subsequent resetting of the pull ring "open" symbol to the pull ring "close" symbol as was discussed in relation to method steps 510 and 511 of FIG. 5. Method step 900 depicts the start of the process. Method step 902 illustrates the determination of whether zero or one items are in a list of text strings, such as the one created as discussed in relation of method step 610 of FIG. 6. Should the determination of method step 902 yield the result that zero or one items are found to be in a list of text strings, the process proceeds to method step 904 wherein the touch and drag is ignored. Subsequently, the process proceeds to method step 905 wherein it is depicted that the process returns to method step 504 of FIG. 5 and continues from that point.

However, if the inquiry of method step 902 indicated that more than one item is currently in a list of text strings, then the process proceeds to method step 906. Method step 906 depicts the removal, or hiding, of the text box (which is utilized to show the contracted window shade box when only the current item is displayed) from the display of the touch screen user interface. Method step 907 illustrates the determination of where the release point of the dragging took placed. Recall from the related art section that touch screen user interfaces are able to determine the X and Y coordinates of a place where a user has touched the screen. Method step 907 depicts that it is determined where the X and Y coordinates end relative to the beginning point of where the "open" pull ring symbol was originally located previous to it being touched and dragged. Method step 908 depicts the first in a series of steps which are necessary to replace the text box that was just removed from the display of the touch screen user interface with an expanded window shade box showing a list of items. Method step 908 depicts the consultation of a parameter known as "maximum specified number of items to be vertically displayed within any list box"; this parameter is envisioned to be one specified by an application designer. Method step 908 shows that the "maximum specified number of items to be vertically displayed within any list box" parameter is compared to the touch-drag and release point. In response to this comparison, then the list box is sized to the lesser of the parameters "maximum specified number of items to be vertically displayed within any list box" or the touch-drag and release point. Thus, the illustrative embodiment of the present invention being discussed can be adjusted by the user based on user touch and drag, such that only a certain maximum specified number (e.g., three, five, seven, etc.) of items will be vertically displayed within any list box. Method step 910 shows the number of text strings that will fit in the resulting list box are transferred from the text string list to the list box. The transfer occurs with the most recent entered item being transferred to the list box first, and with that most recent entered item being placed at the head of the list box, and with all other entered items being listed in the sequence entered.

Method step 912 depicts the inquiry of whether the number of items in the list box just created is less than the total number of items in the string list. Since the list box to be displayed now does not contain all the items from the string list, it is necessary to create a mechanism whereby such items can be accessed. Accordingly, method step 920 shows the creation of up and down buttons for paging through the list, and that those up and down buttons are subsequently placed at the bottom of the list box as has been shown in both FIGS. 4B and 4C.

Method step 923 depicts the updating of the dynamic pull ring sizing control "open" symbol to be a "close" pull ring symbol. That is, in one illustrative embodiment, once a window is opened it can only be closed, so it is necessary to change the pull ring symbol such that the symbol reflects what operation is available at that point. Subsequently, method step 924 shows the creation of the dynamic pull ring sizing control symbol and the placement of that symbol below the created and displayed list box. Subsequently, the process proceeds to method step 926 and stops.

Should the inquiry of method step 912 yield the determination that the list box can contain all items from the string list, then the process proceeds to method step 928 wherein it is shown that the list box is displayed as created in method steps 908–910. Method step 923 depicts the updating of the dynamic pull ring sizing control "open" symbol to be a "close" pull ring symbol. That is, in one illustrative embodiment, once a window is opened it can only be closed, so it is necessary to change the pull ring symbol such that the symbol reflects what operation is available at that point. Subsequently, method step 924 shows the creation of the dynamic pull ring sizing control symbol and the placement of that symbol below the created and displayed list box. Subsequently, the process proceeds to method step 926 and stops.

Figure 10:
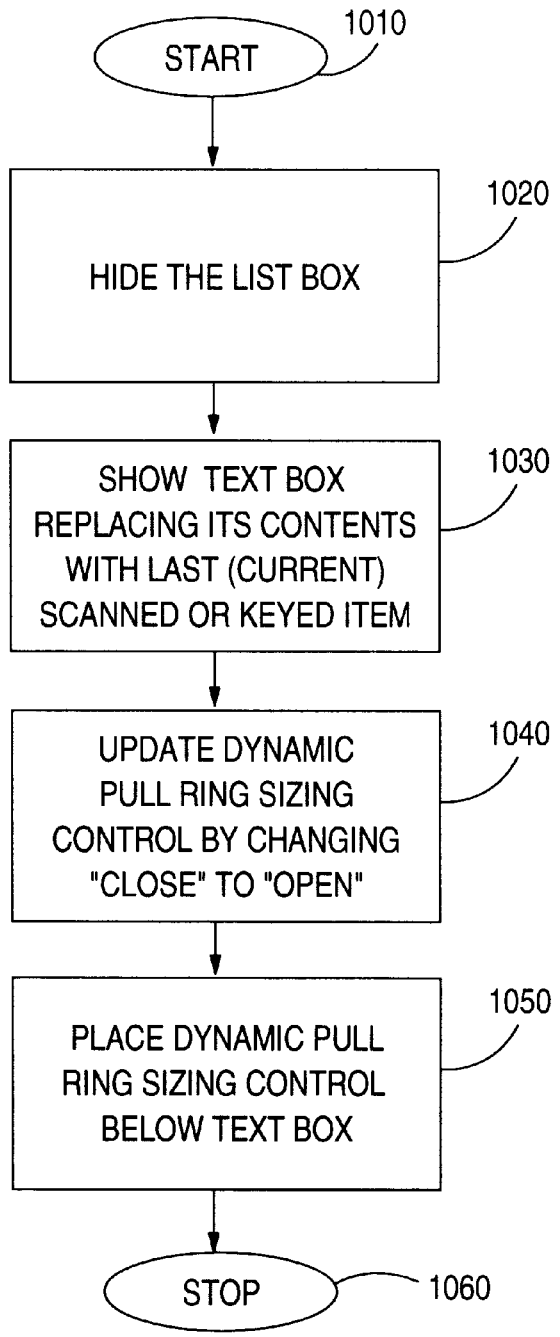
FIG. 10 is a high-level logic flowchart depicting the method and process whereby a window shade is contracted if it is determined that a "closed" pull ring symbol has been touched as was referenced in method step 516 of FIG. 5.

Refer now to FIG. 10 which is a high-level logic flowchart depicting the method and process whereby a window shade box is contracted if it is determined that a "close" pull ring symbol has been touched as was described in reference to method step 516 of FIG. 5. Method step 1010 depicts the start of the process. Method step 1020 illustrates the hiding of the list box, or equivalently, the removal of the list box from the display area of the touch screen user interface. Method step 1030 illustrates the placement of the text box showing as its contents the last scanned or entered in item. That is, the expanded window shade box, as depicted in FIG. 3, is replaced in this step by the contracted window shade box 132 as depicted in FIG. 1. Method step 1040 depicts the resetting of the "close" pull ring symbol to be an "open" pull ring symbol. Method step 1050 shows the placement of the reset "open" pull ring symbol below the text box. Method step 1060 depicts the end of the process. Thus, the function of the method and process depicted in FIG. 10 has the result of replacing the expanded window shade box 310 in conjunction with "close" pull ring symbol 312 as depicted in FIG. 3, with a contracted window shade box 132 in conjunction with "open" pull ring symbol 134 as was shown in FIG. 1.

Figure 11:
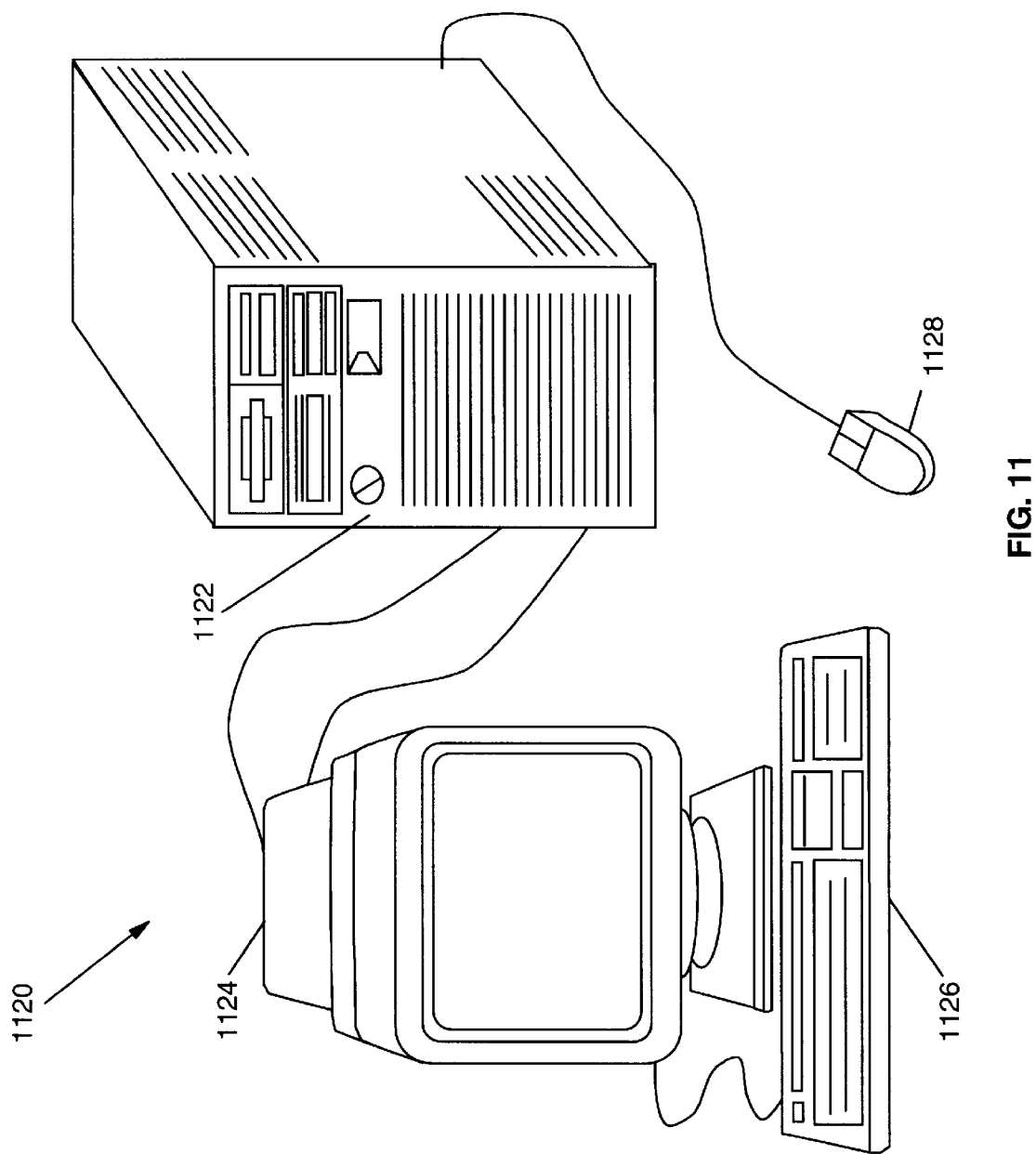
FIG. 11 depicts a pictorial representation of a data-processing system which can be utilized in accordance with the method and system of an illustrative embodiment of the present invention.

With reference now to the figures and in particular with reference now to FIG. 11, there is depicted a pictorial representation of a data-processing system which can be utilized in accordance with the method and system of an illustrative embodiment of the present invention. The method and system provided by an illustrative embodiment of the present invention can be implemented with the data-processing system depicted in FIG. 11. A computer 1120 is depicted which includes a system unit 1122, a video touch display terminal 1124, a keyboard 1126, and a mouse 1128. Computer 1120 may be implemented utilizing any suitable computer such as the IBM 469XX Point of Sale Terminal, the IBM RISC/6000 computer, or the IBM "Aptiva" computer, all products of International Business Machines Corporation, located in Armonk, N.Y. "RISC SYSTEM/6000" and "Aptiva" are trademarks of International Business Machines Corporation.

Figure 12:
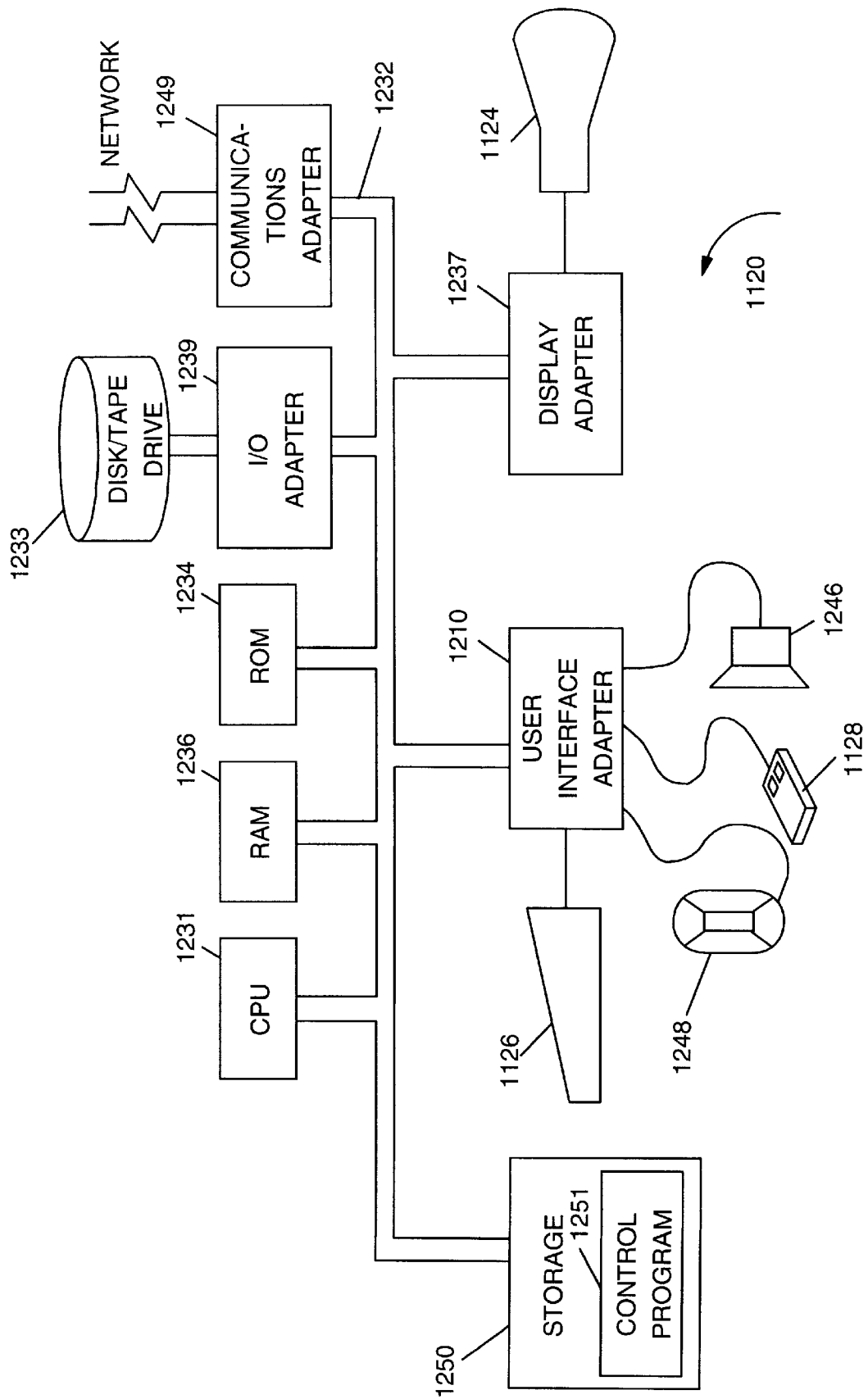
FIG. 12 is an illustration of a representative hardware environment which can be utilized in accordance with the method and system of an illustrative embodiment of the present invention.

FIG. 12 is an illustration of a representative hardware environment which can be utilized in accordance with the method and system of an illustrative embodiment of the present invention. FIG. 12 depicts selected components in computer 1120 in which an illustrative embodiment of the present invention may be implemented. System unit 1122 includes a Central Processing Unit ("CPU") 1231, such as a conventional microprocessor, and a number of other units interconnected via system bus 1232. Computer 1120 includes random-access memory ("RAM") 1234, read-only memory ("ROM") 1236, display adapter 1237 for connecting system bus 1232 to video display terminal 1224, and I/O adapter 1239 for connecting peripheral devices (e.g., disk and tape drives 1233) to system bus 1232. Video display terminal 1224 is the visual output of computer 1120, which can be a CRT-based video display, touch screen display, or touch screen add on, which are all well-known in the art of computer hardware. However, with a portable or notebook-based computer, video display terminal 1224 can be replaced with an LCD-based or a gas plasma-based flat-panel display (again with possibly the foregoing noted touch screen options.) Computer 1120 further includes user interface adapter 1240 for connecting keyboard 1226, mouse 1228, speaker 1246, microphone 1248, and/or other user interface devices, such as a touch screen device (not shown), to system bus 1232. Communications adapter 1249 connects computer 1120 to a data-processing network.

Any suitable machine-readable media may retain the method and system of an illustrative embodiment of the present invention, such as RAM 1234, ROM 1236, a magnetic diskette, magnetic tape, or optical disk (the last three being located in disk and tape drives 1233). Any suitable operating system and associated graphical user interface (e.g., Microsoft Windows) may direct CPU 1231. For example, the AIX operating system and AIX windows windowing system (i.e., graphical user interface) can direct CPU 1231. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 1231, such as touch-screen technology or human voice control. In addition, computer 1120 includes a control program 1251 which resides within computer storage 1250. Control program 1251 contains instructions that when executed on CPU 1231 carries out the operations depicted in the logic flowcharts of FIGS. 5, 6, 7, 8, 9, and 10, and the partially schematic diagrams of 1, 2, 3, 4A, 4B, and 4C as described herein.

Those skilled in the art will appreciate that the hardware depicted in FIG. 12 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for displaying a list of items in point of sale transactions on a touch screen user interface by virtually adjusting a display area of a touch screen user interface, said touch screen user interface having at least a window for displaying said list of items in point of sale transactions and an icon utilized as a virtual handle for expanding and contracting said window for displaying said list of items in point of sale transactions, said method comprising the steps of:

detecting a selection and manipulation of said icon utilized as a virtual handle for expanding and contracting said window for displaying said list of items in point of sale transactions;

determining whether said window for displaying said list of items in point of sale transactions is in either an expanded or contracted state;

in response to a detection of said selection and manipulation of said icon utilized as a virtual handle and a determination that said window for displaying said list of items in point of sale transactions is in a contracted state, enlarging said window for displaying said list of items in point of sale transactions in response to said manipulation; and in response to a detection of said selection of said icon and a determination that said window for displaying is in an expanded state, contracting said window such that the display area of said current touch screen user interface dedicated to the display of said list of items in point of sale transactions is virtually and dynamically adjusted in response to user input.

2. The method of claim 1, wherein said step of detecting further comprises determining whether said icon has been touched and released or touched, dragged, and released.

3. The method of claim 1, wherein said step of determining further comprises the steps of:

determining whether an open icon is active, in which case it is determined that said window shade box is in a contracted state; and determining whether a close icon is active, in which case it is determined that said window shade box is in an expanded state.

4. The method of claim 1, wherein said step of enlarging further comprises the steps of:

in response to a determination that said window for displaying is in a contracted state and a detection that said icon has been selected and manipulated, determining whether said manipulation was either a touch and release or a touch, drag, and release;

in response to a determination that said manipulation was a touch and release, expanding a window shade box to a maximum display size, and activating a close icon; and in response to a determination that said manipulation was a touch, drag, and release, expanding a window shade box to a display size consonant with said drag and release, and activating a close icon.

5. The method of claim 4, wherein said step of expanding a window shade box to a maximum display area further comprises the steps of:

expanding a list box to a maximum display size; and populating said expanded list box with a list of items in a point of sale transaction.

6. The method of claim 4, wherein said step of expanding a window shade box to a display size consonant with said drag and release further comprises the steps of:

expanding a list box to a display size consonant with said drag and release; and populating said expanded list box with a list of items in a point of sale transaction.

7. The method of claim 1, wherein said step of contracting further comprises the step of:

in response to a determination that said window for displaying is in an expanded state and a detection that said icon has been selected and manipulated, displaying a window shade box populated with a point of sale transaction item, and activating an open icon.

8. The method of claim 7, wherein said step of displaying a window shade box populated with a point of sale transaction item further comprises the steps of:

displaying a text box of size sufficient to hold a point of sale transaction item; and populating said displayed text box with a point of sale transaction item.

9. An apparatus for displaying a list of items in point of sale transactions on a touch screen user interface by virtually adjusting a display area of a touch screen user interface, said touch screen user interface having at least a window for displaying said list of items in point of sale transactions and an icon utilized as a virtual handle for expanding and contracting said window for displaying said list of items in point of sale transactions, said apparatus comprising:

means for detecting a selection and manipulation of said icon utilized as a virtual handle for expanding and contracting said window for displaying said list of items in point of sale transactions;

means for determining whether said window for displaying said list of items in point of sale transactions is in either an expanded or contracted state;

means, responsive to a detection of said selection and manipulation of said icon utilized as a virtual handle and a determination that said window for displaying said list of items in point of sale transactions is in a contracted state, for enlarging said window for displaying said list of items in point of sale transactions in response to said manipulation; and means, responsive to a detection of said selection of said icon and a determination that said window for displaying is in an expanded state, for contracting said window such that the display area of said current touch screen user interface dedicated to the display of said list of items in point of sale transactions is virtually and dynamically adjusted in response to user input.

10. The apparatus of claim 9, wherein said means for detecting further comprises determining whether said icon has been touched and released or touched, dragged, and released.

11. The apparatus of claim 9, wherein said means for determining further comprises:

means for determining whether an open icon is active, in which case it is determined that said window shade box is in a contracted state; and means for determining whether a close icon is active, in which case it is determined that said window shade box is in an expanded state.

12. The apparatus of claim 9, wherein said means for enlarging further comprises:

means, responsive to a determination that said window for displaying is in a contracted state and a detection that said icon has been selected and manipulated, for determining whether said manipulation was either a touch and release or a touch, drag, and release;

means, responsive to a determination that said manipulation was a touch and release, for expanding a window shade box to a maximum display size, and activating a close icon; and means, responsive to a determination that said manipulation was a touch, drag, and release, for expanding a window shade box to a display size consonant with said drag and release, and activating a close icon.

13. The apparatus of claim 12, wherein said means for expanding a window shade box to a maximum display area further comprises:

means for expanding a list box to a maximum display size; and means for populating said expanded list box with a list of items in a point of sale transaction.

14. The apparatus of claim 12, wherein said means for expanding a window shade box to a display size consonant with said drag and release further comprises:

means for expanding a list box to a display size consonant with said drag and release; and means for populating said expanded list box with a list of items in a point of sale transaction.

15. The apparatus of claim 9, wherein said means for contracting further comprises:

means, responsive to a determination that said window for displaying is in an expanded state and a detection that said icon has been selected and manipulated, for displaying a window shade box populated with a point of sale transaction item, and activating an open icon.

16. The apparatus of claim 15, wherein said means for displaying a window shade box populated with a point of sale transaction item further comprises:

means for displaying a text box of size sufficient to hold a point of sale transaction item; and means for populating said displayed text box with a point of sale transaction item.

17. A program product for displaying a list of items in point of sale transactions on a touch screen user interface by virtually adjusting a display area of a touch screen user interface, said touch screen user interface having at least a window for displaying said list of items in point of sale transactions and an icon utilized as a virtual handle for expanding and contracting said window for displaying said list of items in point of sale transactions, said program product comprising:

means for detecting a selection and manipulation of said icon utilized as a virtual handle for expanding and contracting said window for displaying said list of items in point of sale transactions;

means for determining whether said window for displaying said list of items in point of sale transactions is in either an expanded or contracted state;

means, responsive to a detection of said selection and manipulation of said icon utilized as a virtual handle and a determination that said window for displaying said list of items in point of sale transactions is in a contracted state, for enlarging said window for displaying said list of items in point of sale transactions in response to said manipulation;

means, responsive to a detection of said selection of said icon and a determination that said window for displaying is in an expanded state, for contracting said window such that the display area of said current touch screen user interface dedicated to the display of said list of items in point of sale transactions is virtually and dynamically adjusted in response to user input; and signal bearing media bearing said means for detecting, means for determining, means for enlarging, and means for contracting.

18. The program product of claim 17 wherein said signal bearing media comprises recordable media.

19. The program product of claim 17 wherein said signal bearing media comprises transmission media.

20. The program product of claim 17, wherein said means for detecting further comprises determining whether said icon has been touched and released or touched, dragged, and released.

21. The program product of claim 17, wherein said means for determining further comprises:

means for determining whether an open icon is active, in which case it is determined that said window shade box is in a contracted state; and means for determining whether a close icon is active, in which case it is determined that said window shade box is in an expanded state.

22. The program product of claim 17, wherein said means for enlarging further comprises:

means, responsive to a determination that said window for displaying is in a contracted state and a detection that said icon has been selected and manipulated, for determining whether said manipulation was either a touch and release or a touch, drag, and release;

means, responsive to a determination that said manipulation was a touch and release, for expanding a window shade box to a maximum display size, and activating a close icon; and means, responsive to a determination that said manipulation was a touch, drag, and release, for expanding a window shade box to a display size consonant with said drag and release, and activating a close icon.

23. The program product of claim 22, wherein said means for expanding a window shade box to a maximum display area further comprises:

means for expanding a list box to a maximum display size; and means for populating said expanded list box with a list of items in a point of sale transaction.

24. The program product of claim 22, wherein said means for expanding a window shade box to a display size consonant with said drag and release further comprises:

means for expanding a list box to a display size consonant with said drag and release; and means for populating said expanded list box with a list of items in a point of sale transaction.

25. The program product of claim 17, wherein said means for contracting further comprises:

means, responsive to a determination that said window for displaying is in an expanded state and a detection that said icon has been selected and manipulated, for displaying a window shade box populated with a point of sale transaction item, and activating an open icon.

26. The program product of claim 25, wherein said means for displaying a window shade box populated with a point of sale transaction item further comprises:

means for displaying a text box of size sufficient to hold a point of sale transaction item; and means for populating said displayed text box with a point of sale transaction item.

* * * * *